(12) United States Patent
Wyatt et al.

(10) Patent No.: US 9,870,375 B2
(45) Date of Patent: Jan. 16, 2018

(54) IMAGE ANALYSIS OF DISPLAY CONTENT FOR DYNAMIC ADJUSTMENT OF A CONTINUOUS SCAN DISPLAY

(71) Applicant: NVIDIA Corporation, Santa Clara, CA (US)

(72) Inventors: David Wyatt, San Jose, CA (US); Ratin Kumar, Cupertino, CA (US); Timothy Bornemisza, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 116 days.

(21) Appl. No.: 14/137,633

(22) Filed: Dec. 20, 2013

(65) Prior Publication Data

US 2015/0178932 A1    Jun. 25, 2015

(51) Int. Cl.
*G06F 17/30*   (2006.01)
*G06T 3/40*    (2006.01)
*H04N 19/132*  (2014.01)
*H04N 19/156*  (2014.01)
*H04N 19/184*  (2014.01)
*H04N 19/436*  (2014.01)

(52) U.S. Cl.
CPC ......... *G06F 17/30247* (2013.01); *G06T 3/40* (2013.01); *H04N 19/132* (2014.11); *H04N 19/156* (2014.11); *H04N 19/184* (2014.11); *H04N 19/436* (2014.11)

(58) Field of Classification Search
CPC . G06F 7/74; G06F 7/5336; G06F 7/60; G06F 3/1475; G06F 19/321; G06F 17/40; G06F 17/30802
USPC .......................... 707/748, 700, 693, 999.107
See application file for complete search history.

(56) References Cited

U.S. PATENT DOCUMENTS

| | | | | |
|---|---|---|---|---|
| 5,801,780 A * | 9/1998 | Schaumont | ............... | G06F 3/14 348/441 |
| 6,141,461 A * | 10/2000 | Carlini | ...................... | G06T 5/20 382/261 |
| 6,249,549 B1 * | 6/2001 | Kim | ...................... | G06T 3/4023 375/240.21 |
| 6,804,418 B1 * | 10/2004 | Yu | ......................... | G06T 3/4023 345/698 |
| 8,139,081 B1 * | 3/2012 | Daniel | ................... | H04N 19/40 345/546 |
| 8,218,860 B1 * | 7/2012 | Berger | ...................... | G06T 5/40 382/162 |
| 2002/0101432 A1 * | 8/2002 | Ohara | ..................... | G06T 5/009 345/589 |
| 2004/0052432 A1 * | 3/2004 | Lee | ........................ | G06T 3/4023 382/298 |

(Continued)

*Primary Examiner* — Mohammed R Uddin

(57) ABSTRACT

Various embodiments relating to reducing memory bandwidth consumed by a continuous scan display screen are provided. In one embodiment, scoring criteria are applied to a reference image of a first image format having a first bit depth to generate an image conversion score. The scoring criteria are based on a histogram of one or more characteristics of the reference image. If the image conversion score is greater than a threshold value, then the reference image is converted to a modified image of a second image format having a second bit depth less than the first bit depth, and the modified image is scanned onto the continuous scan display screen. If the image conversion score is less than the threshold value, then the reference image is scanned onto the continuous scan display screen.

18 Claims, 5 Drawing Sheets

(56) References Cited

U.S. PATENT DOCUMENTS

| | | | |
|---|---|---|---|
| 2004/0119887 A1* | 6/2004 | Franzen | H04N 7/014 348/459 |
| 2004/0263495 A1* | 12/2004 | Sugino | G09G 3/3611 345/204 |
| 2005/0162566 A1* | 7/2005 | Chuang | H04N 7/012 348/714 |
| 2008/0122861 A1* | 5/2008 | Ramanath | G09G 3/2044 345/604 |
| 2009/0027545 A1* | 1/2009 | Yeo | G06T 5/009 348/362 |
| 2009/0219244 A1* | 9/2009 | Fletcher | G09G 3/3406 345/102 |
| 2009/0257621 A1* | 10/2009 | Silver | G06K 9/6202 382/103 |
| 2009/0313484 A1* | 12/2009 | Millet | G06F 1/30 713/300 |
| 2010/0302269 A1* | 12/2010 | Morimoto | G09G 3/3413 345/589 |
| 2011/0261094 A1* | 10/2011 | Ruckmongathan | G09G 3/2018 345/697 |
| 2011/0273482 A1* | 11/2011 | Massart | G09G 3/20 345/690 |
| 2011/0292246 A1* | 12/2011 | Brunner | G06T 5/009 348/231.99 |
| 2012/0201476 A1* | 8/2012 | Carmel | H04N 19/176 382/239 |
| 2013/0015770 A1* | 1/2013 | Aitken | G09G 3/3406 315/154 |
| 2013/0063469 A1* | 3/2013 | Ruckmongathan | G09G 3/342 345/589 |
| 2013/0107120 A1* | 5/2013 | Inoue | G06T 7/0002 348/558 |
| 2014/0139706 A1* | 5/2014 | Jang | H04N 9/045 348/241 |
| 2014/0168185 A1* | 6/2014 | Han | G06F 3/1446 345/211 |
| 2014/0307962 A1* | 10/2014 | Seikh | G06K 9/4642 382/165 |

* cited by examiner

IMAGE ANALYSIS OF DISPLAY CONTENT FOR DYNAMIC ADJUSTMENT OF A CONTINUOUS SCAN DISPLAY

BACKGROUND

High quality, high resolution displays are now widely used in various mobile computing devices. Such high resolution displays require fast processing to deliver high resolution imagery, smooth user interface interactions, fast Web page rendering, and quality 3D gaming, among other operations. However, such features may consume a significant amount of power. In order to prolong battery life of a mobile computing device, power consumption of various hardware components of the mobile computing device may be reduced whenever possible without sacrificing noticeable quality of displayed imagery or user interactions.

DETAILED DESCRIPTION

Figure 1:
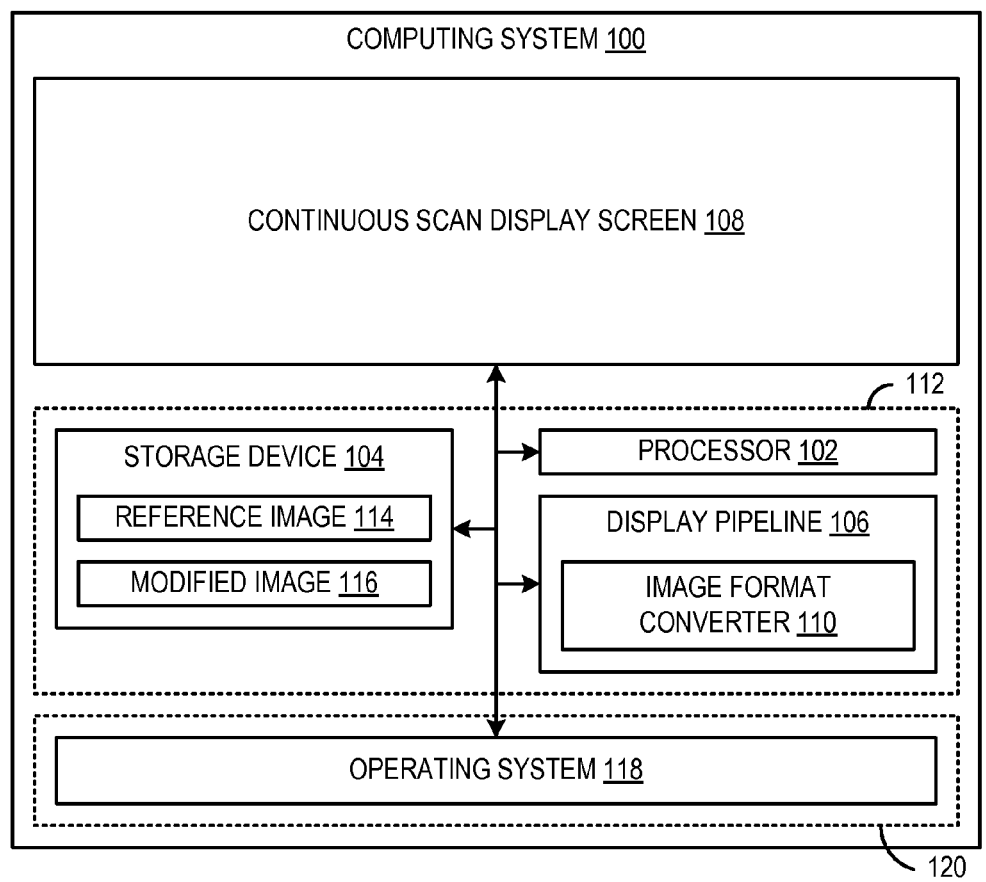
FIG. 1 schematically shows a computing system according to an embodiment of the present disclosure.

The present description relates to managing system properties (for example reducing memory bandwidth) consumed by a continuous scan display screen of a computing device. More particularly, the present description relates to various approaches for determining whether display content of an image is suitable for down-converting the image scanned on the display screen (e.g., reducing a bit depth of the image). For example, scoring criteria may be applied to a reference image to determine how much the reference image would be negatively affected by the down conversion. The scoring criteria may be based on a histogram of one or more characteristics of the reference image. In particular, one or more threshold values may be applied to the histogram to determine whether the characteristics of the reference image are suitable for down conversion. By detecting and distinguishing between images that are amenable to the pixel depth reduction, down-conversion of an image can be applied with limited impact on a perceived quality of the image to the user in order to reduce memory bandwidth consumed by scanning the image to the display screen.

In some embodiments, once a reference image is determined to be down converted (referred to herein as a down-conversion condition), further analysis of the reference image may be performed to select a most suitable image format that limits impact on a perceived quality of the image to the user beyond the reduced bit depth of the down-converted image. For example, some image formats may blur edges in an image relative to other image formats. In one example, edge detection analysis may be performed on a reference image to determine whether the reference image has relatively more edges or relatively fewer edges. If the reference image has more edges, then the reference image may be converted to the image format that blurs relatively less edges. On the other hand, if the reference image has fewer edges, then the reference image may be converted to the image format that blurs relatively more edges.

In some embodiments, an image may be down-converted and scanned onto the display screen for a period when there is no change to the image in order to reduce power consumption for the operation of the display. This period may be referred to herein as a static image period or a static image condition. Upon detecting a static image period, a reference image may be converted to a different image format with a lesser bit depth if the reference meets the scoring criteria, and the modified image may be displayed during the static image period. Selective use of this approach allows for higher definition when an image is being actively altered while lowering a burden on system resources when there is no change to the image. Such an approach may be preferably implemented in a mobile computing device, such as a system-on-chip (SOC) application, to achieve energy efficiency, better thermal characteristics and/or prolong battery life of the mobile computing device.

FIG. 1 schematically shows a computing system 100 according to an embodiment of the present disclosure. The computing system 100 may take the form of one or more personal computers, home-entertainment computers, network computing devices, gaming devices, mobile computing devices (e.g., tablet), mobile communication devices (e.g., smart phone), and/or other computing devices. The computing system 100 includes a processor 102 in communication with a storage device 104, a display pipeline 106, and a continuous scan display screen 108.

The processor 102 includes one or more processor cores, and instructions executed thereon may be configured for sequential, parallel, and/or distributed processing. The processor 102 includes one or more physical devices configured to execute instructions. For example, the processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

In one example, the processor includes a central processing unit (CPU) and a graphics processing unit (GPU) that includes a plurality of cores. In this example, computation-intensive portions of instructions are executed in parallel by the plurality of cores of the GPU, while the remainder of the instructions is executed by the CPU. It will be understood that the processor may take any suitable form without departing from the scope of the present description.

The storage device 104 includes one or more physical devices configured to hold instructions executable by the processor. When such instructions are implemented, the state of the storage device may be transformed—e.g., to hold different data. The storage device may include removable and/or built-in devices. The storage device may include optical memory, semiconductor memory, and/or magnetic memory, among others. The storage device may include volatile, nonvolatile, dynamic, static, read/write, read-only, random-access, sequential-access, location-addressable, file-addressable, and/or content-addressable devices. It will be understood that the storage device may take any suitable form without departing from the scope of the present description.

Storage locations of the storage device include a memory allocation accessible by the processors during execution of instructions. This memory allocation can be used for execution of one or more software layers 120 that may include an operating system 118 that manages software-level operation of the computing system.

The display pipeline 106 is configured to render a two-dimensional raster representation of an image for display on the continuous scan display screen. The display pipeline includes a plurality of logic units and/or hardware units. In some embodiments, at least some of the units are fixed purpose or operation specific units. However, in some embodiments, some units are general purpose units that may perform different steps of the pipeline, and in some cases, perform general purpose computing.

One of the units of the display pipeline includes an image format converter 110 that may be implemented as hardware, firmware, or software. The image format converter is configured to convert an image from a first image format to a second image format that is different from the first image format. In some cases, the image format converter down-converts an image to a format having a lesser bit depth. In one particular example, the image format converter is configured to convert an image from a first image format that has a bit depth of 24 bits per pixel (e.g., 888 RGB) to a second image format that has a bit depth of 16 bits per pixel (e.g., 565 RGB). In one example, the image format converter is configured to down-convert an image by truncating the bit depth of each bit of the image format. By down-converting the image, a memory bandwidth utilized to scan the image onto the continuous scan display screen may be reduced, and correspondingly power consumption of operation of the continuous scan display screen may be reduced.

It will be understood that the visual appearance of the reference image is not otherwise changed by the conversion beyond the down-conversion to a format having a lesser bit depth. It will be understood that the image format converter may convert an image from virtually any suitable image format to virtually any other suitable image format in any suitable manner without departing from the scope of the present description. For example, in some embodiments, the image format converter is configured to convert a reference image of a YUV image format to a modified image of a different YUV format having a lesser bit depth. In another example, the image format converter is configured to convert a reference image of a YUV image format to a modified image of an RGB image format. In yet another example, the image format converter is configured to convert a reference image of an RGB format to a modified image of a YUV image format.

In some embodiments, the image format converter is configured to convert the reference image from a first image format to either a second image format or a third image format depending on characteristics of display content of the reference image. In one example, the image format converter is configured to convert a reference image of an RGB format of a higher bit depth to a modified image of an RGB format of a lower bit depth or a YUV image format of a lower bit depth. In another example, the image format converter is configured to convert a reference image of a YUV image format of a higher bit depth to a modified image of an RGB format of a lower bit depth or a YUV image format of a lower bit depth.

In some embodiments, the processor, the storage device, and the display pipeline may be implemented as a system-on-chip (SoC) 112. In a SoC implementation, typically the processor, the storage device, and the display pipeline, are formed as separate logic units within a single SoC integrated circuit, and an on-chip communications interface enables communication between these separate logic units. Further, in some embodiments, the display pipeline may be physically integrated with the processor. In some embodiments, one or more of the processing steps may be performed in software.

The continuous scan display screen 108 is used to present a visual representation of data held by the storage machine in the form of an image. The image is rendered by the display pipeline. The continuous scan display screen is configured to repeatedly update a state of pixels that make up the display screen to display the image. In particular, the continuous scan display screen systematically processes the area of the pixels line by line or "scans" the pixels to update the image. The processor is configured to control the continuous scan display screen by scanning an image produced by the display pipeline on to the continuous scan display screen.

As the herein described methods and processes may change the data held by the storage device, and thus transform the state of the storage device, the state of display screen may likewise be transformed to visually represent changes in the underlying data. In the illustrated example, a reference image 114 of a first image format having a first bit depth is stored in the storage device, and further scanned on the continuous scan display screen. The image format converter may convert the reference image to a modified image 116 of a second image format having a second bit depth that is less than the first bit depth in response to determination of an operating condition, such as a static image condition that includes a period where an image remains unchanged or is not updated. The modified image may be stored in the storage device, and further scanned on the continuous scan display screen in place of the reference image, under some conditions. In some embodiments, the reference image and/or the modified image may be stored in a buffer of the display pipeline, and scanned directly to the continuous scan display screen.

It will be understood that the continuous scan display screen is used merely as an example, and any type of display screen technology may be employed. Such display devices may be combined with the processor and the storage device in a shared enclosure, or such display devices may be peripheral display devices.

As discussed above, the computing system is configured to reduce memory bandwidth consumed by the continuous scan display screen when possible. In one example, the processor is configured to determine a static image period where no updates are happening to the reference image and the image is otherwise unmodified. For example, the static image period may be defined as a period in which an image displayed on the continuous scan display screen is not expected to change for several frames. In one example, an indication of the static image period is received from the operating system. For example, the indication of the static image period may include a command to stop generating or triggering image synchronization operation interrupts (e.g., VSYNC interrupts). Further, in response to determining the static image period, the processor is configured to trigger the image format converter to convert the reference image to the modified image, and scan the modified image onto the continuous scan display screen during the static image period. In some embodiments, the processor may be configured to delay triggering the image format converter for a designated duration from a start of the idle display condition. For example, the designated duration may last from 1-2 seconds from the start of the idle display condition. By delaying conversion of the reference image for the designated duration, a likelihood of the display screen becoming active and ending the static image period may be reduced and confidence in the static image period may be increased. It will be understood that this technique and other techniques may be used to improve instances when the conversion may be used.

Correspondingly, the processor is configured to determine an active image period or condition that occurs when the static image period is not occurring. In one example, an indication of the active image period is determined based on whether VSYNC interrupts are being generated by the display pipeline. Further, the processor may be configured to scan the reference image on to the continuous scan display screen during the active image period.

In some embodiments, measures may be taken to determine whether a reference image is a suitable candidate for conversion. In particular, an image quality of some images, as perceived by a user, may be more negatively affected by a down-conversion than other images based on various characteristics of the images. For example, highly saturated images may be less affected by a reduction in bit depth than images having a lower saturation level.

In one example, the processor is configured to apply scoring criteria to the reference image to generate an image conversion score in response to an operating condition. For example, the operating condition may include a static image period of the continuous scan display screen. It will be understood that any suitable operating condition may be determined to trigger the analysis and down-conversion of an image without departing from the scope of the present description. The processor is further configured to compare the image conversion score to one or more threshold values to yield either an affirmative output or a negative output. If the comparison yields an affirmative output, the processor converts the reference image to the modified image and scans the modified image onto the continuous scan display screen during the operating condition. If the comparison yields a negative output, the processor scans the reference image onto the continuous scan display screen during the static image period.

In some embodiments, the scoring criteria are based on a histogram of one or more characteristics of the reference image. In particular, the display pipeline may be configured to generate various histograms of different image characteristics of the reference image during processing of the reference image. FIGS. 2-5 show examples of histograms that may be generated by the display pipeline. The different histograms may be used to analyze whether the reference image is suitable for down-conversion. For example, the histograms may be used by the processor to determine an image conversion score of the reference image. Further, the histograms may be used to select a most appropriate image format for down-conversion based on the characteristics of the reference image. The histograms include a plurality of different buckets that represent different characteristic values of the reference image. The heights of the buckets represent the frequency of the associated characteristic values in the reference image. Non-limiting examples of characteristics of the reference image that may be analyzed or otherwise used to create a histogram include saturation level, pixel intensity, color distance, a number of edges, and other suitable image characteristics.

Figure 2:
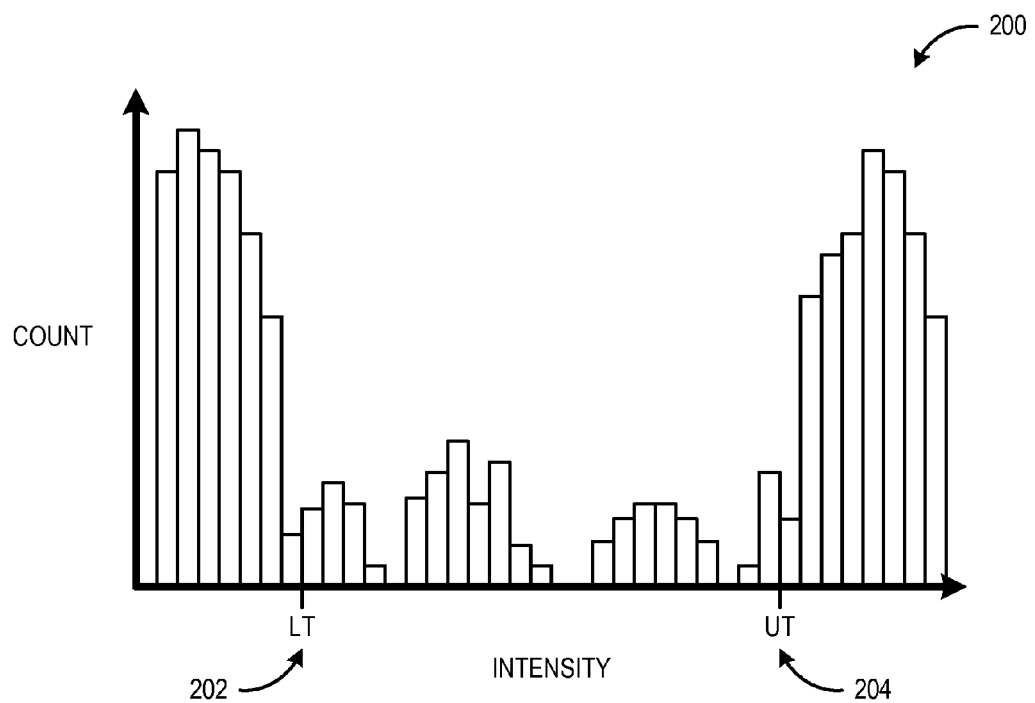
FIG. 2 shows an example of a histogram of pixel intensity of a reference image that may be determined to be suitable for image format conversion based on an image conversion score of the reference image.
Figure 3:
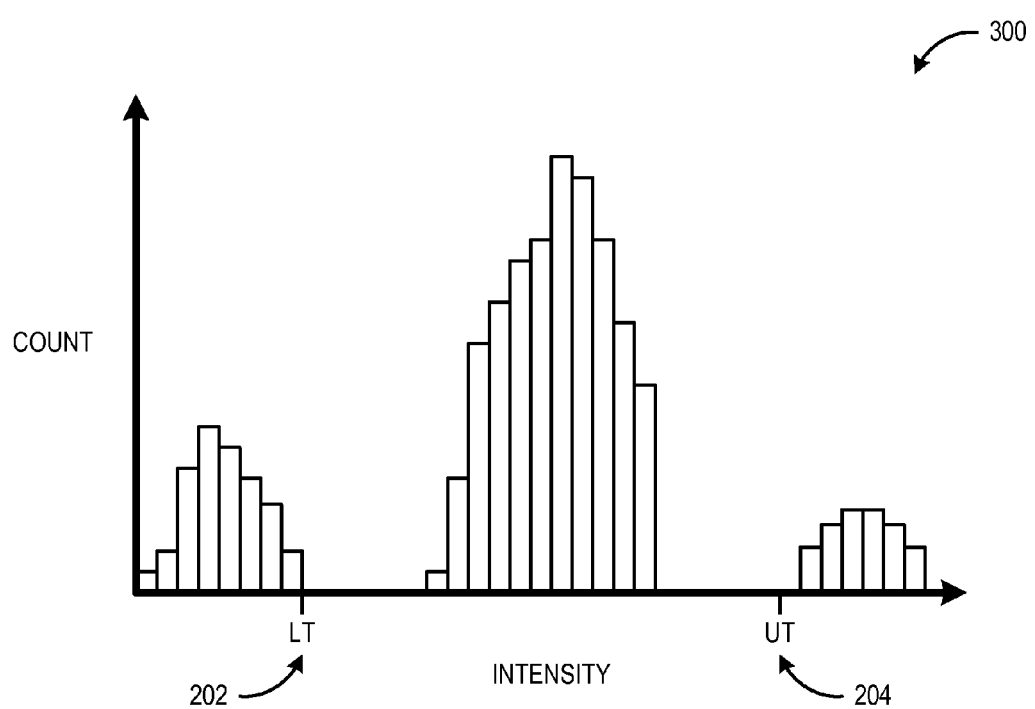
FIG. 3 shows an example of a histogram of pixel intensity of a reference image that may be determined to be unsuitable for image format conversion based on an image conversion score of the reference image.
Figure 4:
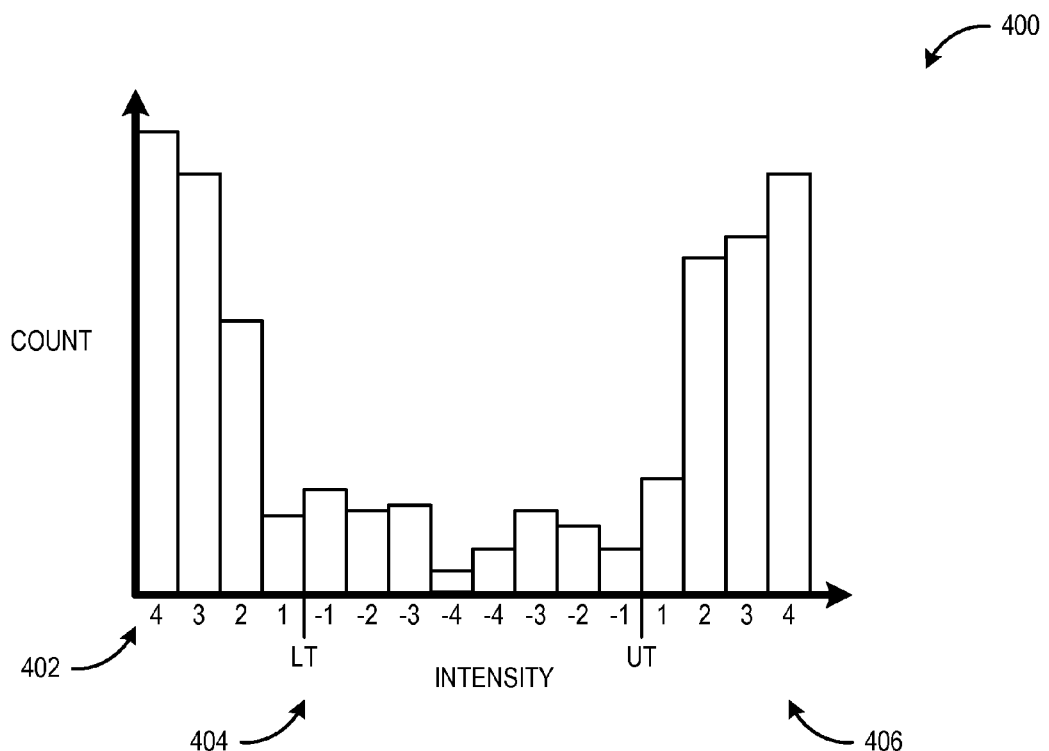
FIG. 4 shows an example of a score map applied to a histogram that is used to analyze whether a reference image ought to be converted to a modified image.

FIGS. 2 and 3 show examples of histograms of pixel intensity of a reference image that may be used to determine an image conversion score. Pixel intensity or a saturation level of the reference image may be determined in various manners. In some cases, the reference image is of an RGB format that includes, for each pixel of the reference image, an R channel pixel intensity value, a G channel pixel intensity value, and a B channel pixel intensity value. In one example, the histogram is populated with a greatest pixel intensity value selected from the R channel pixel intensity value, the G channel pixel intensity value, and the B channel pixel intensity value of each pixel. In other words, the histogram may include buckets for each greatest intensity value of pixels of the reference image.

In another example, the histogram is populated with the sum of the R channel pixel intensity value, the G channel pixel intensity value, and the B channel pixel intensity value for each pixel. For example, the histogram may be traversed on a per channel basis (e.g., three times, one for each of the three channels). In other words, the histogram may include buckets for each pixel intensity value of pixels of the reference image. Alternatively, three separate channel-specific histograms may be generated and analyzed to determine the image conversion score of the reference image.

In still another example, the histogram is populated with a composite value of pixel intensity of each pixel. The composite value is calculated by vector multiplying the three channels of the RGB format with different coefficients associated with each channel. In one example, a coefficient value 70 is associated with the R channel pixel intensity value, a coefficient value 20 is associated with the G channel pixel intensity value, and a coefficient value 10 is associated with the B channel pixel intensity.

FIG. 2 shows an example of a histogram 200 of pixel intensity of a reference image. An image conversion score is generated based on the histogram, and that image score is used to determine whether to down convert to another image format (e.g., one with lower bit depth). The histogram includes a lower pixel intensity threshold value 202 and an upper pixel intensity threshold value 204 that are set to determine the suitability of the reference image for image format conversion. It will be understood that the upper and lower threshold values may be set to any suitable pixel intensity without departing from the scope of the present description. The histogram 200 indicates that a majority of the pixels of the image have intensities in the top-most buckets above the upper threshold value (close to fully saturated) or in the lowest buckets below the lower threshold value (near black). The upper and lower threshold values are set as part of the scoring criteria, because the sorts of pixels above the upper threshold and below the lower threshold may be nearly indistinguishable between an image format having greater bit depth (e.g., 32 bpp) and an image format having lesser bit depth (e.g., 16 bpp). In other words, an image having a relatively high percentage of pixel intensities in these buckets is a suitable candidate for down-conversion, in the sense that down-conversion will have minimal or no effect upon the viewer's perception of the image.

FIG. 3 shows an example of another histogram 300 of pixel intensity of a reference image. In this case, histogram 300 indicates that a relatively high percentage of the pixels have intensities in the middle buckets below the upper threshold value and above the lower threshold value. These sorts of pixels are more negatively affected by a down-conversion of the reference image as perceived by the user. As such, it may be determined that a reference image with these characteristics is not a suitable candidate for down-conversion into a modified image format.

A dot product calculation may be used in connection with the histograms in order to generate the image conversion score. Specifically, the image conversion score may be arrived at by taking the dot product of a coefficient vector and a frequency vector. The coefficient vector includes a coefficient for each bucket of the histogram. An example coefficient vector is shown at 402 in FIG. 4. Specifically, the example coefficient vector is {4,3,2,1,−1 . . . 4}. The frequency vector is the value in each bucket (e.g., the number of pixels having a given intensity). The image conversion score is generated by taking the dot product of these two vectors. In this example, a higher image conversion score means that the image is relatively more desirable as a candidate for down-conversion. Conversely, a relatively lower score means that the image is not a good candidate for down-conversion. A threshold may be established in this regard, such that down-conversion is only performed if the image conversion score exceeds a threshold.

From the above, it will be appreciated that the coefficient vector typically is constructed to weight certain characteristic values (e.g., intensity values) relatively higher than other values. The example vector of FIG. 4 has the effect of generating a higher image conversion score when the image has a relatively high number of pixels with high and/or low intensities (e.g., below lower threshold 404 and/or above threshold 406). A high percentage of pixels in the middle intensities (between thresholds 404 and 406) yields a lower image conversion score—i.e., that the image is not a good candidate for down-conversion.

Different image formats may have different effects on a down-converted image. For example, some image formats may be more apt to blur edges in an image. As one example, a planar YUV format may cause such blurring. Accordingly, in some embodiments, an amount of edge definition of the reference image (i.e., a number of edges in the reference image) is used as scoring criteria to calculate an image conversion score or otherwise determine whether it is appropriate to down-convert.

In one example, the scoring criteria applied to the reference image to determine whether the reference image is suitable for down-conversion are based on a number of edges in the reference image. For example, a threshold value of edges may be set to indicate that the reference image includes enough edges to make it unsuitable for conversion to the YUV image format. If the reference image has a number of edges greater than the threshold value, then the reference image is scanned onto the continuous scan display screen. On the other hand, if the reference image has a number of edges less than the threshold value, then the reference image is converted to a converted image having the YUV format and the converted image is scanned onto the continuous scan display screen.

In another example, the number of edges is used as scoring criteria in a determination of selecting an appropriate image format for down conversion. For example, a determination may be made to down convert a reference image based on any suitable scoring criteria corresponding to any suitable image characteristic values of the reference image. Once the decision to down convert the reference image is made, a second determination is made using the number of edges in the reference image as the scoring criteria. In particular, if the number of edges of the reference image is greater than the threshold value, then the reference image is converted to a converted image of the RGB format and the converted image is scanned onto the continuous scan display screen. On the other hand, if the number of edges of the reference image is less than the threshold value, then the reference image is converted to a converted image of the YUV format and the converted image is scanned onto the continuous scan display screen.

Note that, in this example, both of the RGB and YUV formats have bit depths that are less than a bit depth of the original format of the reference image. The RGB format may be more appropriate for an image that has more edges, because the RGB format blurs edges less than the YUV format. On the other hand, in some cases, the YUV format may provide richer color definition than the RGB format, and thus may be a suitable selection for down conversion. Further, it will be appreciated that the reference image may be down-converted from any suitable format to the RGB format, the YUV format, or another image format.

Figure 5:
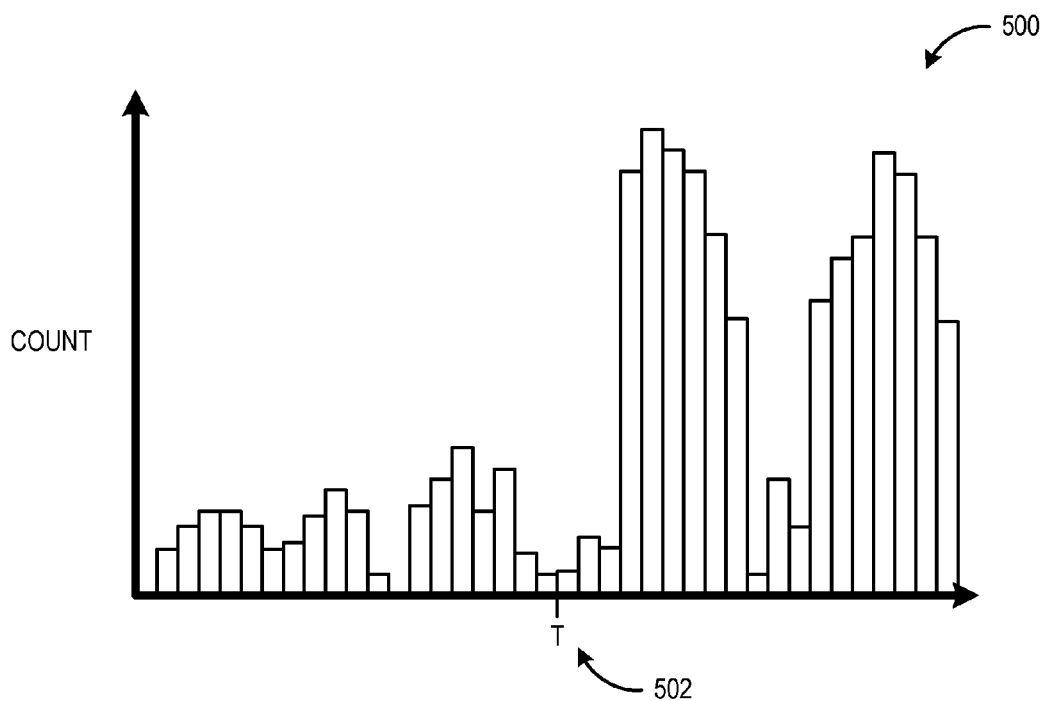
FIG. 5 shows an example of a histogram of color distance representative of edge definition of a reference image.

In one example, the reference image is of a YUV format. The YUV format includes a luma value and chroma coordinate values in the image. The luma value defines a brightness of the reference image on a per pixel basis. The chroma coordinates values define colors of four pixel blocks of the reference image. The chroma coordinate values may be used to calculate a color distance between blocks on a color gamut. Moreover, edge definition of the reference image may be characterized by a histogram of color distance. FIG. 5 shows an example of a histogram 500 of color distance representative of edges in a reference image. The histogram includes buckets for each distance value between the chroma coordinate values in the reference image. A threshold distance value 502 may be set to determine at which color distance an edge is defined. In other words, if a color distance is greater than the threshold distance value, then that color distance is considered to be an edge in the reference image. On the other hand, if a color distance is less than the threshold distance value, then that color distance is considered to not be an edge in the reference image.

In one example, the image conversion score for the histogram 500 is determined by comparing an accumulation of distance values greater than the threshold distance value with an accumulation of distance values less than the threshold distance value. If the accumulation of distance values greater than the threshold distance value is greater than the accumulation of distance values less than the threshold distance value, then an affirmative output is yielded. On the other hand, if the accumulation of distance values greater than the threshold distance value is less than the accumulation of distance values less than the threshold distance value, then a negative output is yielded. In one example, the reference image is converted to the YUV format and scanned onto the continuous scan display screen if the positive output is yielded. Further, the reference image is converted to the RGB format and scanned onto the continuous scan display screen if the negative output is yielded.

It will be understood that edge definition of an image may be determined in any suitable manner without departing from the scope of the present disclosure. It will be understood that any suitable characteristics may be included in the scoring criteria without departing from the scope of the present description. It will be appreciated that the herein described YUV format may include any suitable variation or derivative including Y'UV, Y"UV, YCbCr, YPbPr, etc.

Figure 6:
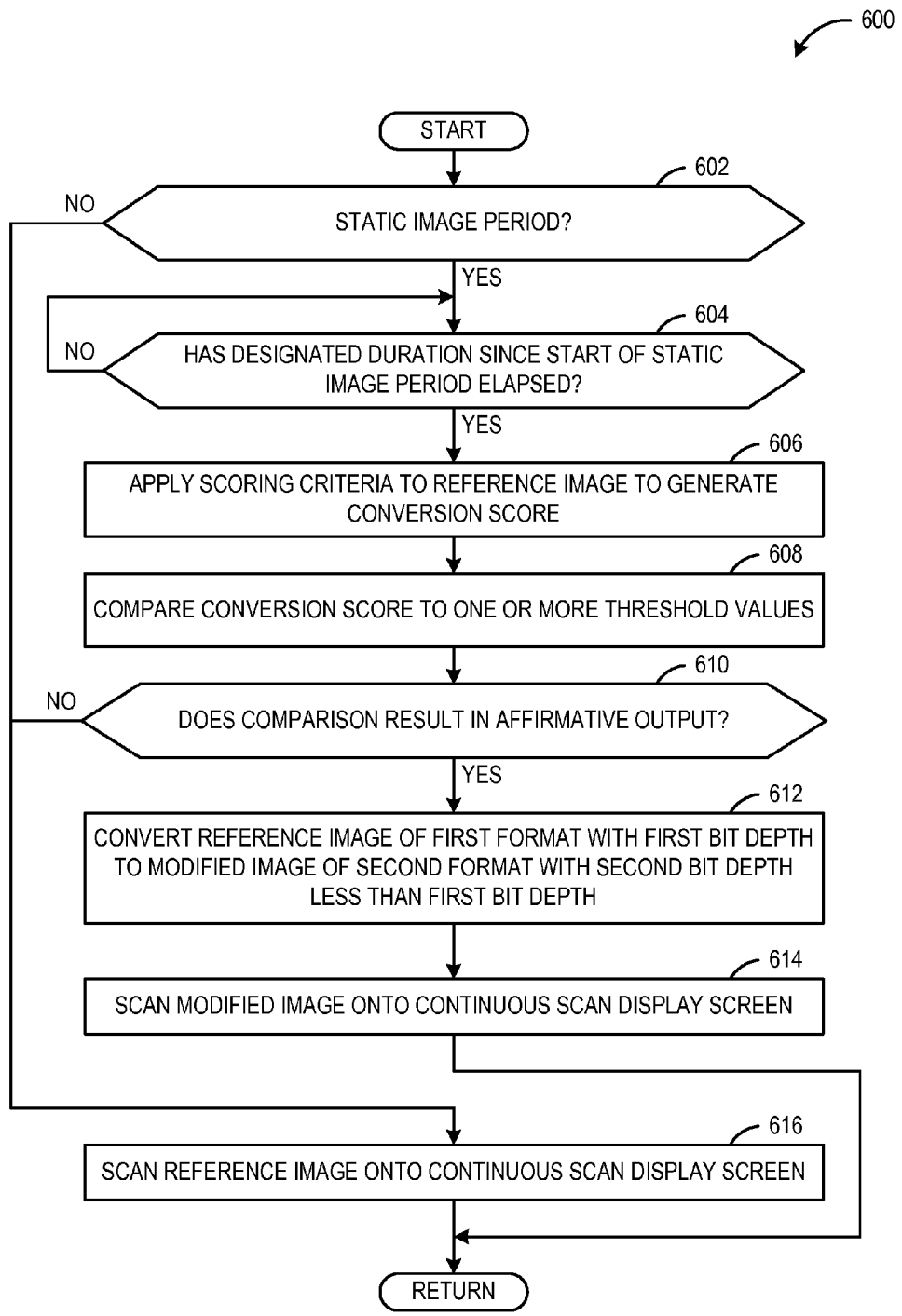
FIG. 6 shows a method for switching an image format of an image displayed by a continuous scan display screen according to an embodiment of the present disclosure.

FIG. 6 shows a method 600 for switching an image format of an image displayed by a continuous scan display screen according to an embodiment of the present disclosure. For example, the method 600 may be performed by the processor 102 of the computing system shown in FIG. 1.

At 602, the method 600 includes determining whether there is a static image period of the display screen. In one example, the determination may be made in response to receiving, from an operating system, an indication that the operating system does not expect to change an image for a plurality of image frames. Such an indication may include a command to stop generating image synchronization operation interrupts. It will be understood that the determination may be made in any suitable manner. If it is determined that there is a static image period, then the method 600 moves to 604. Otherwise, the method 600 moves to 616.

At 604, the method 600 includes determining whether a designated duration since a start of the static image period has elapsed. For example, the designated duration may be from 1-2 seconds. If it is determined that the designated duration has elapsed, then the method 600 moves to 606. Otherwise, the method 600 returns to 604.

At 606, the method 600 includes applying scoring criteria to the reference image to generate an image conversion score for the reference image. For example, the scoring criteria may be based at least partially on a saturation level of the reference image, edge definition, or another characteristic of the reference image. In some embodiments, the scoring criteria are based on a histogram of one or more characteristics of the reference image. In one example, the histogram is generated by the display pipeline hardware. As another example, the histogram is generated by logic in the GPU.

At 608, the method 600 includes comparing the image conversion score to one or more threshold values. Such comparisons yield either an affirmative output or a negative output. The affirmative output indicates that the reference image is a relatively good candidate for down-conversion. The negative output indicates that the reference image is a relatively poor candidate for down-conversion.

At 610, the method 600 includes determining whether the comparison yields an affirmative output or a negative output. If it is determined that the comparison yields the affirmative output, then the method 600 moves to 612. Otherwise, the method 600 moves to 616.

At 612, the method 600 includes converting the reference image of a first image format having a first bit depth to a modified image of a second image format having a second bit depth that is less than the first bit depth. In one example, the first image format has a bit depth of 24 bits per pixel and the second image format has a bit depth of 16 bits per pixel.

At 614, the method 600 includes scanning the modified image onto the continuous scan display screen. The modified image is scanned onto the display screen during the static image period in order to reduce memory bandwidth consumed by the display screen. In one example, the modified image is scanned onto the display screen for the entirety of the static image period.

On the other hand, if it is determined that there is an active image period that occurs when the static image period is not occurring, or that the image conversion score of the reference image yields a negative output when compared to the one or more threshold values, at 616, the method 600 includes scanning the reference image onto the continuous scan display screen. The reference image is scanned onto the display screen, because it is determined that the operating conditions and/or the characteristics of the reference image would cause display of a corresponding modified image to be negatively perceived by the user.

Figure 7:
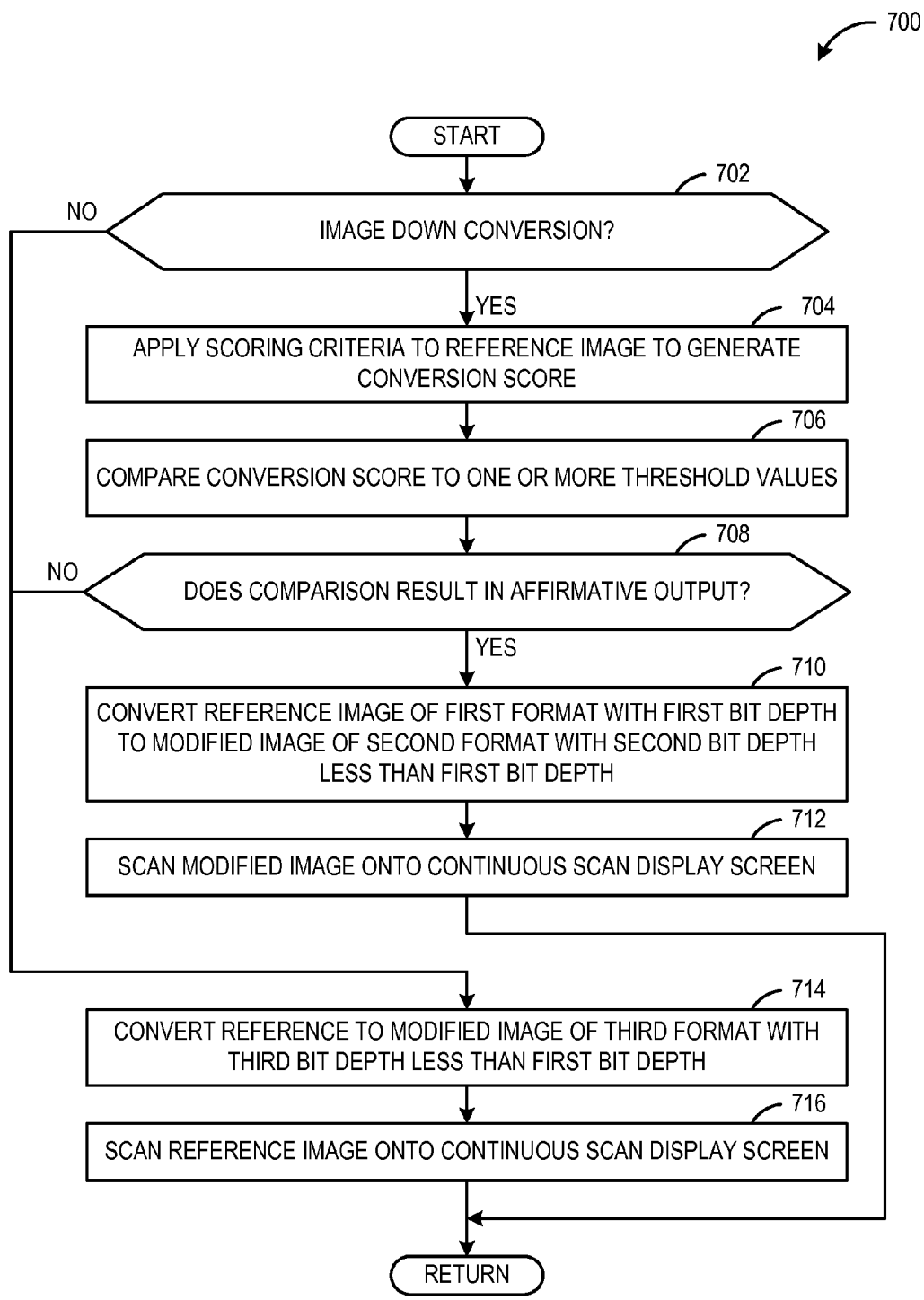
FIG. 7 shows a method another method for switching an image format of an image displayed by a continuous scan display screen according to an embodiment of the present disclosure.

FIG. 7 shows a method 700 for switching an image format of an image displayed by a continuous scan display screen according to an embodiment of the present disclosure. For example, the method 700 may be performed by the processor 102 of the computing system shown in FIG. 1.

At 702, the method 700 includes determining an image down-conversion condition where a reference image is converted from a first image format with a first bit depth to a modified image of a different image format having a bit depth less than the first bit depth. In one example, the down-conversion condition is determined by performing steps 602-612 of method 600. In one example, the image down-conversion condition occurs during a static image period of the continuous scan display screen. If it is determined that there is an image down-conversion condition, then the method 700 moves to 704. Otherwise, the method 700 returns to other operations.

At 704, the method 700 includes applying scoring criteria to the reference image to generate an image conversion score. In one example, the scoring criteria are based on a histogram of one or more characteristics of the reference image. Non-limiting examples of characteristics on which the scoring criteria are based or otherwise derived include saturation level, pixel intensity, edge definition (i.e., a number of edges), color distance, etc.

At 706, the method 700 includes comparing the image conversion score to one or more threshold values. Such comparisons yield either an affirmative output or a negative output.

At 708, the method 700 includes determining whether the comparison yields an affirmative output or a negative output. If it is determined that the comparison yields an affirmative output, then the method 700 moves to 710. Otherwise, the method 700 moves to 714.

At 710, the method 700 includes converting the reference image to a modified image of a second image format having a second bit depth less than the first bit depth. In one example, the reference image is determined to have a number of edges greater than a threshold number of edges, so the reference image is converted to the RGB format. In other words, the scoring criteria indicate that the relatively high edge definition of the reference image make the reference image a good candidate for conversion to the RGB format.

At 712, the method 700 includes scanning the modified image onto the continuous scan display screen during the down-conversion condition.

At 714, the method 700 includes converting the reference image to a modified image of a third image format having a third bit depth less than the first bit depth. In one example, the reference image is determined to have a number of edges less than a threshold number of edges, so the reference image is converted to the YUV format. In other words, the scoring criteria indicate that the relatively low edge definition of the reference image make the reference image a good candidate for conversion to the YUV format.

At 716, the method 700 includes scanning the modified image onto the continuous scan display screen during the down-conversion condition.

It will be understood that methods described herein are provided for illustrative purposes only and are not intended to be limiting. Accordingly, it will be appreciated that in some embodiments the methods described herein may include additional or alternative steps or processes, while in some embodiments, the methods described herein may include some steps or processes that may be reordered, performed in parallel or omitted without departing from the scope of the present disclosure. In some embodiments, portions of the method may be combined or otherwise performed in conjunction.

It will be understood that while the examples above focus on continuous scan displays of mobile computing devices, the description may be broadly applicable to other electronic devices. Moreover, it will be understood that the concepts discussed herein may be broadly applicable to dynamically altering display content and system properties associated with the display content in order to optimize energy consumption for scan out to a continuous scan display screen. Furthermore, it will be understood that the methods described herein may be performed using any suitable software and hardware in addition to or instead of the specific examples described herein. The subject matter of the present disclosure includes all novel and non-obvious combinations and sub-combinations of the various processes, systems and configurations, and other features, functions, acts, and/or properties disclosed herein, as well as any and all equivalents thereof. It will be understood that the configurations and/or approaches described herein are exemplary in nature, and that these specific embodiments or examples are not to be considered in a limiting sense, because numerous variations are possible.

The invention claimed is:

1. A method for displaying an image on a display screen of a computing device, the method comprising:
   generating a histogram of one or more characteristics of a reference image represented in a first image format having a first bit depth;
   using information represented by the histogram to determine whether to convert the reference image to a second format having a second bit depth that is smaller than the first bit depth, wherein said determining whether to convert comprises computing an image conversion score based on the histogram;
   responsive to a positive determination of said determining, converting the reference image to a modified image represented in the second image format having the second bit depth;
   rendering the modified image that is in the second image format having the second bit depth for display on the display screen; and
   responsive to a negative determination of said determining, rendering the reference image that is in the first format having the first bit depth for display on the display screen;
   wherein the determining whether to convert comprises applying a scoring criterion in response to a static image period of the display screen;
   wherein the determining whether to convert further comprises comparing the image conversion score with one or more threshold values.

2. The method of claim 1, wherein the first image format comprises an RGB format comprising: an R channel pixel intensity value; a G channel pixel intensity value; and a B channel pixel intensity value, wherein the one or more characteristics of the reference image comprise: a greatest pixel intensity value selected from the R channel pixel intensity value; the G channel pixel intensity value; and the B channel pixel intensity value, wherein the scoring criterion is applied based on a-the histogram of the one or more characteristics of the reference image, and wherein the histogram comprises buckets for each greatest intensity value of pixels of the reference image.

3. The method of claim 1, wherein the first image format comprises an RGB format comprising: an R channel pixel intensity value; a G channel pixel intensity value; and a B channel pixel intensity value, wherein the one or more characteristics of the reference image comprise: the R channel pixel intensity value; the G channel pixel intensity value; and the B channel pixel intensity value, wherein the scoring criterion is applied based on a-the histogram of the one or more characteristics of the reference image, and wherein the histogram comprises buckets for each pixel intensity value of pixels of the reference image.

4. The method of claim 1, wherein the first image format comprises a YUV format comprising a luma value and chroma coordinate values, wherein the one or more characteristics of the reference image comprise a distance value between the chroma coordinate values on a color gamut, wherein the scoring criterion is applied based on a-the histogram of the one or more characteristics of the reference image, and wherein the histogram comprises buckets for each distance value between the chroma coordinate values in the reference image.

5. The method of claim 4, wherein said modified image is displayed on said display screen based on a determination if an accumulation of distance values greater than the threshold distance value is greater than an accumulation of distance values less than the threshold distance value, and wherein said method further comprises displaying said reference image on said display screen-if-responsive to a determination that the accumulation of distance values greater than the threshold distance value is less than the accumulation of distance values less than the threshold distance value.

6. The method of claim 1, wherein the image conversion score is computed by computing a dot product of a coefficient vector and a frequency vector, wherein the coefficient vector comprises a plurality of coefficients, each coefficient associated with a different bucket of the histogram of the one or more characteristics of the reference image, and wherein the frequency vector comprises a plurality of frequencies, each frequency associated with a different bucket of the histogram.

7. The method of claim 1, wherein the one or more characteristics of the reference image comprises a number of edges in the reference image, wherein the one or more threshold values comprises a threshold number of edges, and wherein the modified image has a YUV format if the number of edges of the reference image is less than the threshold number of edges.

8. A computing system, comprising:
   a display screen;
   a processor; and
   a storage device storing instructions that, when executed by the processor, perform a method of:
   accessing a histogram of one or more characteristics a reference image represented in a first image format having a first bit depth;
   using information represented by the histogram to determine whether to convert the reference image to a second format having a second bit depth that is smaller than the first bit depth, wherein determining whether to convert comprises computing an image conversion score based on the histogram;
   responsive to a positive determination of said determining, converting the reference image to a modified image represented in the second image format having the second bit depth;

rendering the modified image that is in the second image format having the second bit depth for display on the display screen; and responsive to a negative determination of said determining, rendering the reference image that is in the first format having the first bit depth for display on the display screen;

wherein the determining whether to convert comprises applying a scoring criterion in response to a static image period of the display screen;

wherein the determining whether to convert further comprises comparing the image conversion score with one or more threshold values.

9. The computing system of claim 8, wherein the first image format comprises an RGB format comprising: an R channel pixel intensity value; a G channel pixel intensity value; and a B channel pixel intensity value, wherein the one or more characteristics of the reference image comprise: a greatest pixel intensity value selected from the R channel pixel intensity value; the G channel pixel intensity value; and the B channel pixel intensity value, wherein the scoring criterion is applied based on a-the histogram of the one or more characteristics of the reference image, and wherein the histogram comprises buckets for each greatest intensity value of pixels of the reference image.

10. The computing system of claim 8, wherein the first image format comprises an RGB format comprising: an R channel pixel intensity value; a G channel pixel intensity value; and a B channel pixel intensity value, wherein the one or more characteristics of the reference image comprise: the R channel pixel intensity value; the G channel pixel intensity value; and the B channel pixel intensity value, wherein the scoring criterion is applied based on a-the histogram of the one or more characteristics of the reference image, and wherein the histogram comprises buckets for each pixel intensity value of pixels of the reference image.

11. The computing system of claim 8, wherein the first image format comprises a YUV format comprising a luma value and chroma coordinate values, wherein the one or more characteristics of the reference image comprise a distance value between the chroma coordinate values on a color gamut, wherein the scoring criterion is applied based on a-the histogram of the one or more characteristics of the reference image, and wherein the histogram comprises buckets for each distance value between the chroma coordinate values in the reference image.

12. The computing system of claim 8, wherein the computing the image conversion score comprises deriving a dot product of a coefficient vector and a frequency vector, wherein the coefficient vector comprises a plurality of coefficients, each coefficient associated with a different bucket of a-the histogram of the one or more characteristics of the reference image, and wherein the frequency vector comprises a plurality of frequencies, each frequency associated with a different bucket of the histogram.

13. The computing system of claim 8, wherein the determining whether to convert further comprises comparing the image conversion score with one or more threshold values, wherein the one or more characteristics of the reference image comprises a number of edges in the reference image, wherein the one or more threshold values comprises a threshold number of edges, and wherein the reference image is converted to the modified image having a YUV format responsive to a determination that the number of edges of the reference image is less than the threshold number of edges.

14. A method for generating images for display on a display screen of a computing device, the method comprising:

generating a histogram of one or more characteristics of a reference image represented in a first image format having a first bit depth;

detecting an image conversion condition;

responsive to detection of the image conversion condition, using information represented by the histogram to determine whether to convert the reference image to a second format having a second bit depth that is smaller than the first bit depth, wherein determining whether to convert comprises computing an image conversion score based on the histogram according to a scoring criterion in response to a static image period of the display screen;

comparing the image conversion score to one or more threshold values;

selecting the second mage format from a plurality of image formats based on the comparing and the detecting, wherein each image format of said plurality of image formats has a bit depth smaller than the first bit depth;

responsive to a determination that the comparing produces a first result: converting the reference image to a modified image of the second image format having the second bit depth than the first image format; and rendering the modified image that is in the second image format for display on the display screen; and responsive to a determination that the comparing produces a second result: rendering the reference image that is in the first image format for display on the display screen.

15. The method of claim 14, wherein the scoring criterion is based on the histogram of one or more characteristics of pixels of the reference image.

16. The method of claim 14, wherein the image conversion condition corresponds to a static image period of the display screen.

17. The method of claim 14, wherein the plurality of image formats comprises an RGB format and a YUV format.

18. The method of claim 17, wherein applying the scoring criterion comprises determining a number of edges in the reference image, wherein if the number of edges of the reference is greater than a threshold number of edges, then the reference image is converted to the RGB format, and wherein if the number of edges of the reference image is less than the threshold number of edges, then the reference image is converted to the YUV format.

* * * * *